(12) United States Patent
Sasazawa et al.

(10) Patent No.: US 7,240,412 B2
(45) Date of Patent: Jul. 10, 2007

(54) COMPOSITE LATHE

(75) Inventors: Yukinaga Sasazawa, Yamatokoriyama (JP); Kazuhiko Matsumoto, Yamatokoriyama (JP); Tsutomu Tokuma, Yamatokoriyama (JP)

(73) Assignee: Mori Seiki Co., Ltd., Yamatokoriyama-shi (JP)

( * ) Notice: Subject to any disclaimer, the term of this patent is extended or adjusted under 35 U.S.C. 154(b) by 0 days.

(21) Appl. No.: 11/394,159

(22) Filed: Mar. 31, 2006

(65) Prior Publication Data

US 2006/0236514 A1 Oct. 26, 2006

(30) Foreign Application Priority Data

Apr. 22, 2005 (JP) ............................. 2005-125018

(51) Int. Cl.
*B23P 23/00* (2006.01)

(52) U.S. Cl. .................. 29/27 C; 82/117; 82/121; 82/129; 82/137; 82/149; 409/202; 409/165

(58) Field of Classification Search ............. 29/27 C, 29/27 R; 82/129, 117, 120, 121, 131, 132, 82/137, 138, 149, 157, 159; 409/165, 202, 409/212, 235
See application file for complete search history.

(56) References Cited

U.S. PATENT DOCUMENTS

| | | | | |
|---|---|---|---|---|
| 4,785,525 A | * | 11/1988 | Ishida et al. ................. | 29/27 R |
| 4,800,790 A | * | 1/1989 | Hasz ............................ | 82/148 |
| 5,127,140 A | * | 7/1992 | Oiwa et al. ................. | 29/27 C |
| 6,626,075 B2 | * | 9/2003 | Hirose et al. ................. | 82/118 |
| 6,640,677 B2 | * | 11/2003 | Ueda et al. .................... | 82/129 |
| 6,901,829 B2 | * | 6/2005 | Wu .............................. | 82/121 |
| 6,928,909 B1 | * | 8/2005 | Akimoto et al. .............. | 82/129 |
| 6,945,147 B2 | * | 9/2005 | Sakashita ..................... | 82/149 |
| 7,039,992 B2 | * | 5/2006 | Tokuma et al. ............. | 29/27 C |
| 7,043,805 B2 | * | 5/2006 | Tokuma et al. ............. | 29/27 C |
| 2005/0022351 A1 | * | 2/2005 | Tokuma et al. ............. | 29/27 C |

FOREIGN PATENT DOCUMENTS

JP 6-106438 A 4/1994

\* cited by examiner

*Primary Examiner*—Dana Ross
(74) *Attorney, Agent, or Firm*—Smith Patent Office

(57) ABSTRACT

To provide a composite lathe enabling the overlapping of movement areas without lowering supporting stiffness of a tool post, and thus realizing enhanced machinability. An XY supporting plane A by which a tool post 5 in is supported to be movable in an X-axis direction is set non-parallel to an XZ supporting plane B by which a third spindle 6 is supported to be movable in the X-axis direction, and an axis of the movement in the X-axis direction of the tool post 5 is set apart in a Y-axis direction from an axis of the movement in the X-axis direction of the third spindle 6.

3 Claims, 17 Drawing Sheets

COMPOSITE LATHE

BACKGROUND OF THE INVENTION

1. Field of the Invention

The present invention relates to a composite lathe including: a first and a second spindle headstock disposed on a bed; a tool post disposed between the first and second spindle headstocks to be movable in an X-axis direction; and a third spindle disposed on the bed to be movable in the X-axis direction, a Y-axis direction, and a Z-axis direction.

2. Description of the Related Art

An example of a composite lathe of this type is structured such that a spindle headstock is disposed on a bed, and a lower tool post and an upper tool post are disposed on an outer lower side and an inner upper side of a vertical line going through an axis of the spindle headstock respectively to be movable in an X-axis direction and a Z-axis direction.

This composite lathe adopts a structure such that an X-axis guide by which the upper tool post is supported to be movable in the X-axis direction and an X-axis guide by which the lower tool post is supported to be movable in the X-axis direction are disposed on the same plane (see, for example, Patent document 1).

[Patent document 1] Japanese Patent Application Laid-open No. He 6-106438

Incidentally, in the structure in which the upper tool post and the lower tool post are moved on the same plane as in the aforesaid conventional lathe, movement areas of cutting points of the upper and lower tool posts are limited, inhibiting each of them from moving into the movement area of the other, resulting in limited machinability.

Here, for example, in order to extend the movement area of the cutting point of the upper tool post to an area across the cutting point of the lower tool post, it is necessary to make the upper tool post overhang from a surface of the X-axis guide movably supporting the upper post. However, such a structure tends to lower supporting stiffness of the upper tool post, giving an adverse influence to machining accuracy.

SUMMARY OF THE INVENTION

The present invention was made in consideration of the above circumstances and it is an object thereof to provide a composite lathe allowing the overlapping of movement areas without lowering supporting stiffness of a tool post, and thus realizing improved machinability.

In an invention, a composite lathe includes a bed; a first and a second spindle headstock disposed on the bed to face each other and to be coaxial with each other; a tool post disposed between the first spindle headstock and the second headstock to be movable in an X-axis (up/down) direction; and a third spindle disposed on the bed to be movable in the X-axis direction, a Y-axis (front/back) direction, and a Z-axis (left/right) direction, wherein an XY supporting plane which is parallel to the X axis and Y axis and by which the tool post is supported to be movable in the X-axis direction intersects with an XZ supporting plane which is parallel to the X axis and Z axis and by which the third spindle is supported to be movable in the X-axis direction, and wherein an axis of the movement in the X-axis direction of the tool post is set apart in the Y-axis direction from the XZ supporting plane, and an axis of the movement in the X-axis direction of the third spindle is set apart in the Z-axis direction from the XY supporting plane.

In the invention, the XY supporting plane by which the tool post is supported to be movable in the X-axis direction is set so as to intersect with the XZ supporting plane by which the third spindle is supported to be movable in the X-axis direction, and the axes of the movement in the X-axis direction of the tool post and the third spindle are set apart from the XZ supporting plane and the XY supporting plane. Therefore, it is possible to extend the movement area of the cutting point of the third spindle to the area under the cutting point of the tool post without any interference between the tool post and the third spindle, and the movement area of the cutting point of the tool post and the movement area of the cutting point of the third spindle can overlap each other, which can enhance machinability. In this case, since the tool post and the third spindle need not overhang, no deterioration in supporting stiffness thereof occurs.

In a preferable embodiment of the invention, the XY supporting plane, which is parallel to the X axis and the Y axis, and the XZ supporting plane, which is parallel to the X axis and the Z axis, are orthogonal to each other.

In the above-described embodiment, the XY supporting plane is made parallel to the X axis and the Y axis, and the XZ supporting plane is made parallel to the X axis and the Z axis, so that the both supporting planes are orthogonal to each other, which more surely allows the aforesaid both movement areas to overlap each other.

In another preferable embodiment of the invention, a cutting point of the tool post is positioned vertically under a straight line connecting axes of the first spindle headstock and the second spindle headstock, and a movement area of a cutting point of the third spindle extends up to an area lower than the cutting point of the tool post positioned at a rising end in the X-axis direction.

In the above-described embodiment, the cutting point of the tool post is positioned vertically under the straight line connecting the axes of the first and second spindle headstocks, and the movement area of the third spindle is extended to the position under the cutting point of the tool post positioned at the rising end in the X-axis direction. Therefore, a tool blade edge position of the tool post and a tool blade edge position of the third spindle can be measured by one presetter. As a result, it is possible to measure the tool positions with a simple structure and at low cost.

In still another preferable embodiment of the invention, the third spindle includes a tool spindle, and the tool spindle is rotary indexable around the Y axis.

In the above-described embodiment, since the tool spindle of the third spindle is supported to be rotary indexable around the Y axis, complicated machining by so-called B-axis driving is made possible.

DETAILED DESCRIPTION OF THE PREFERRED EMBODIMENT

An embodiment of the present invention will be hereinafter described based on the attached drawings.

Figure 1:
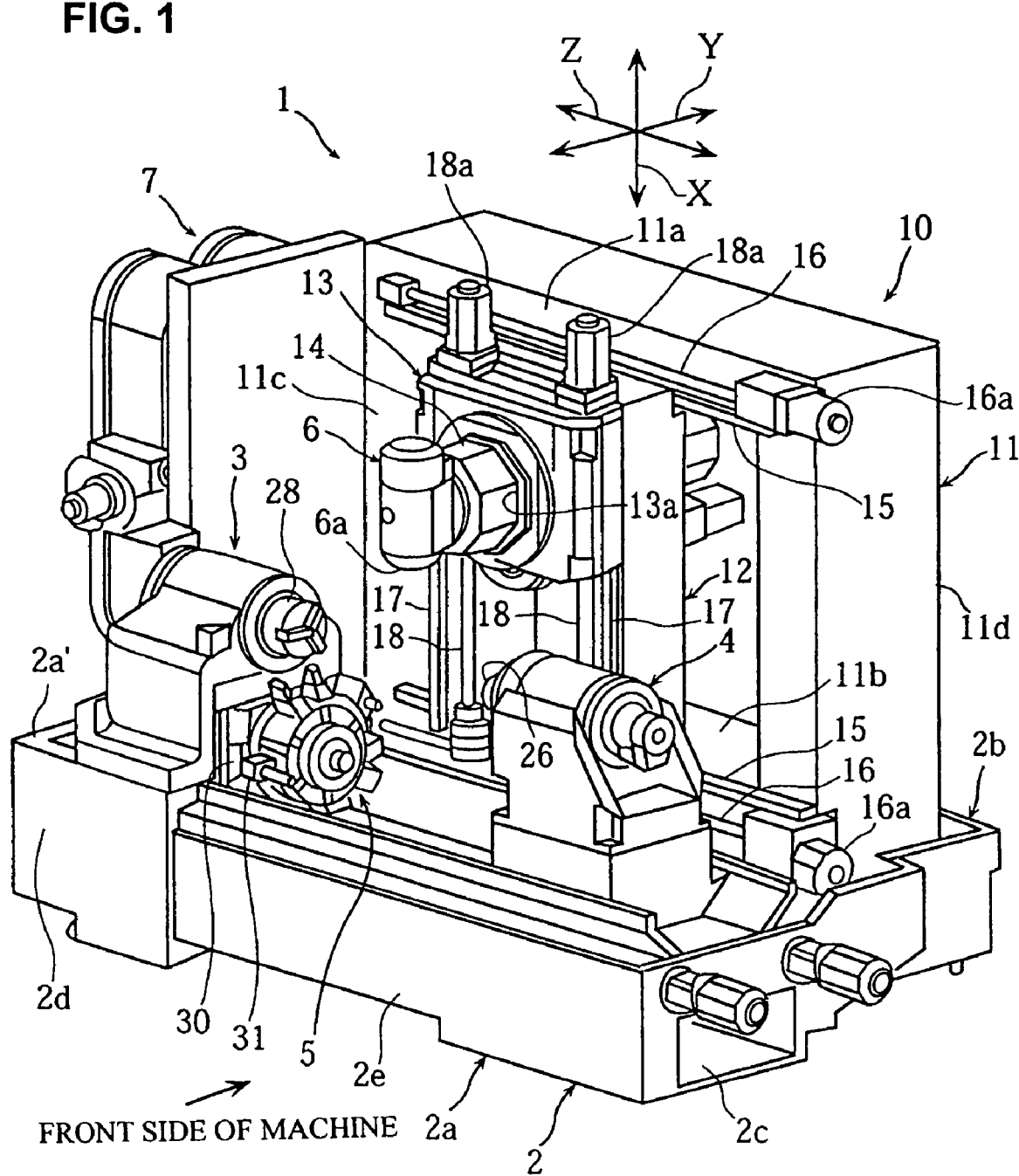
FIG. 1 is a perspective view of a composite lathe according to one embodiment of the present invention.
Figure 2:
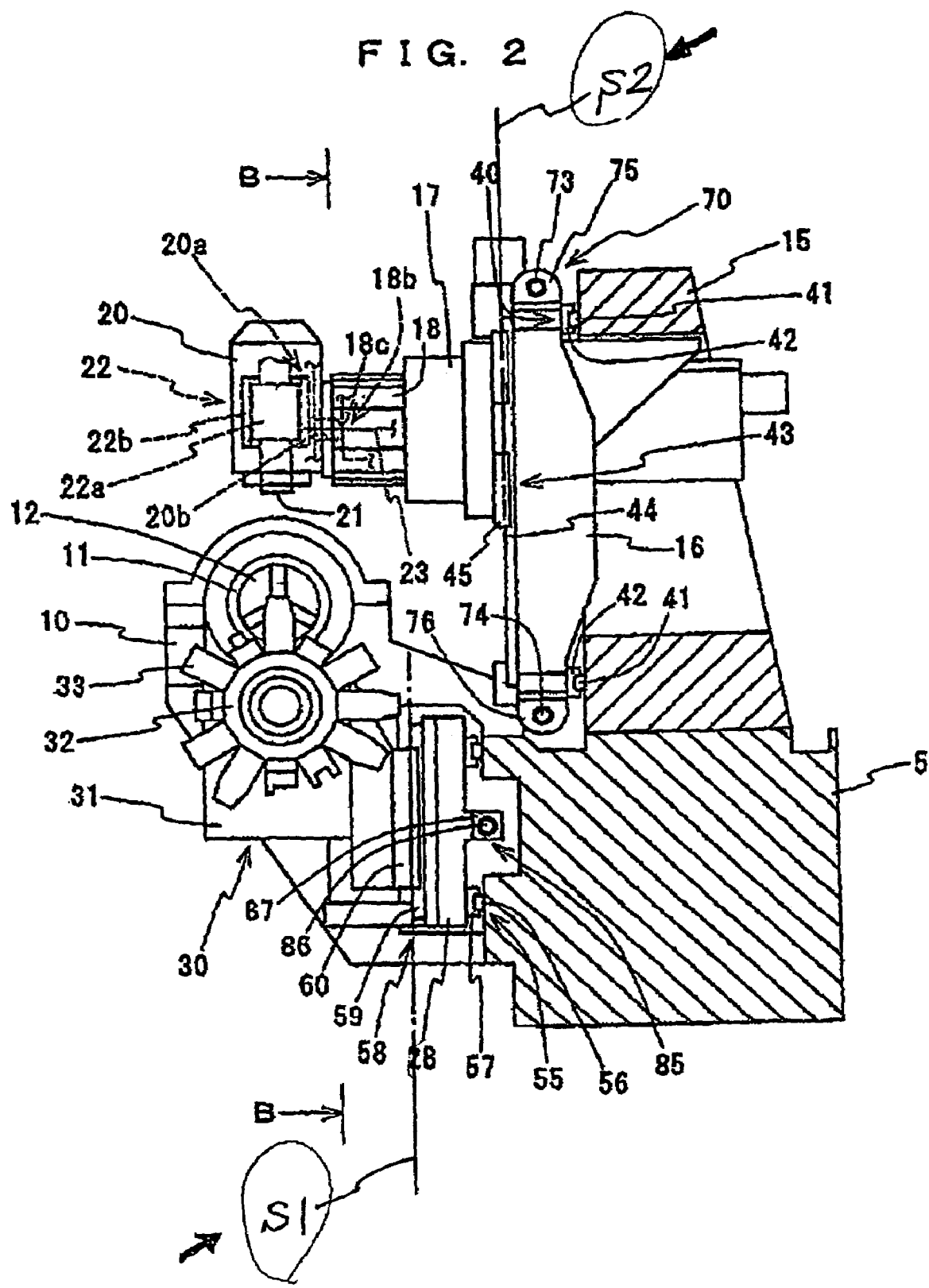
FIG. 2 is a side view of the composite lathe.
Figure 3:
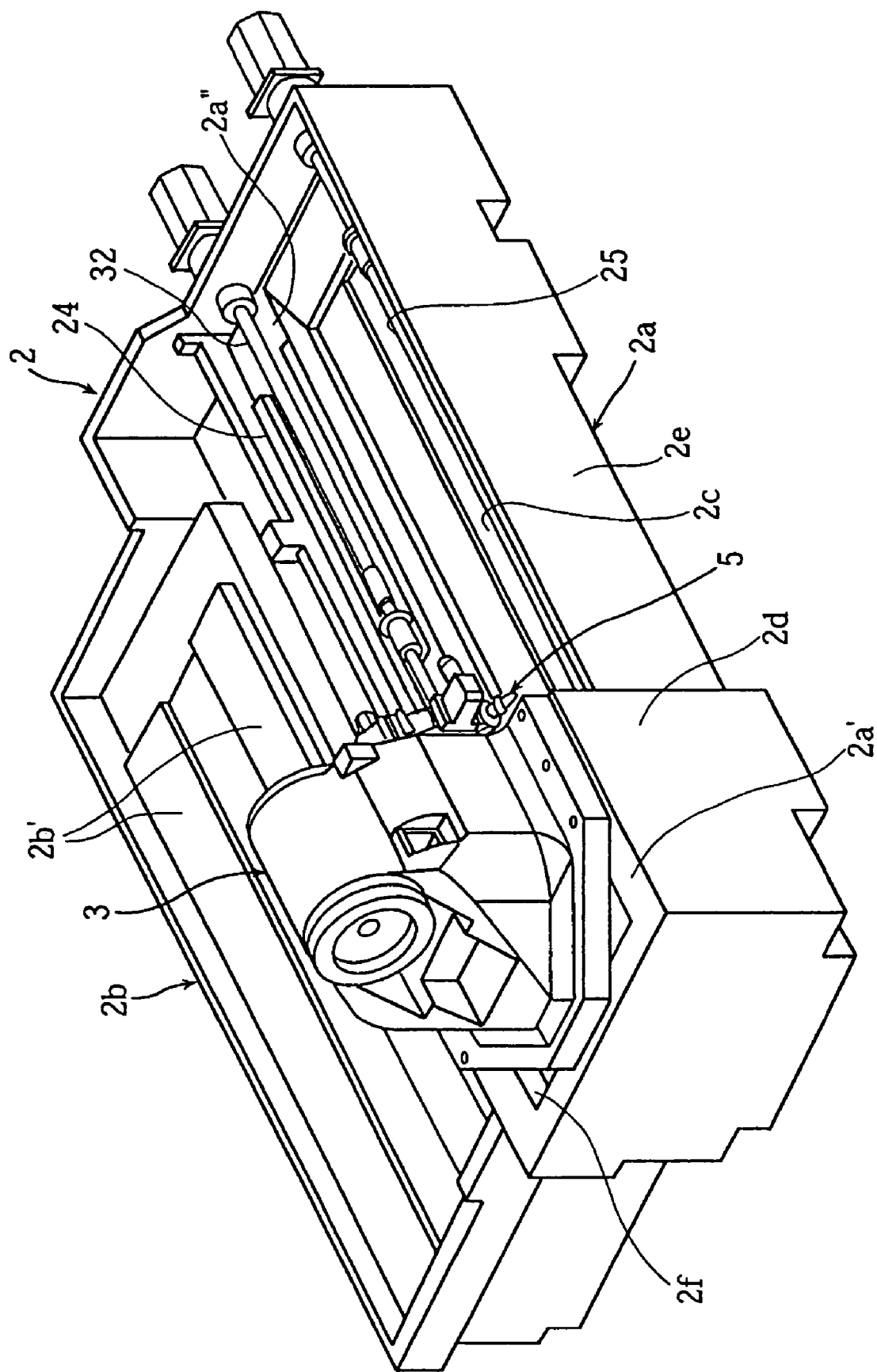
FIG. 3 is a perspective view of a bed of the composite lathe.
Figure 4:
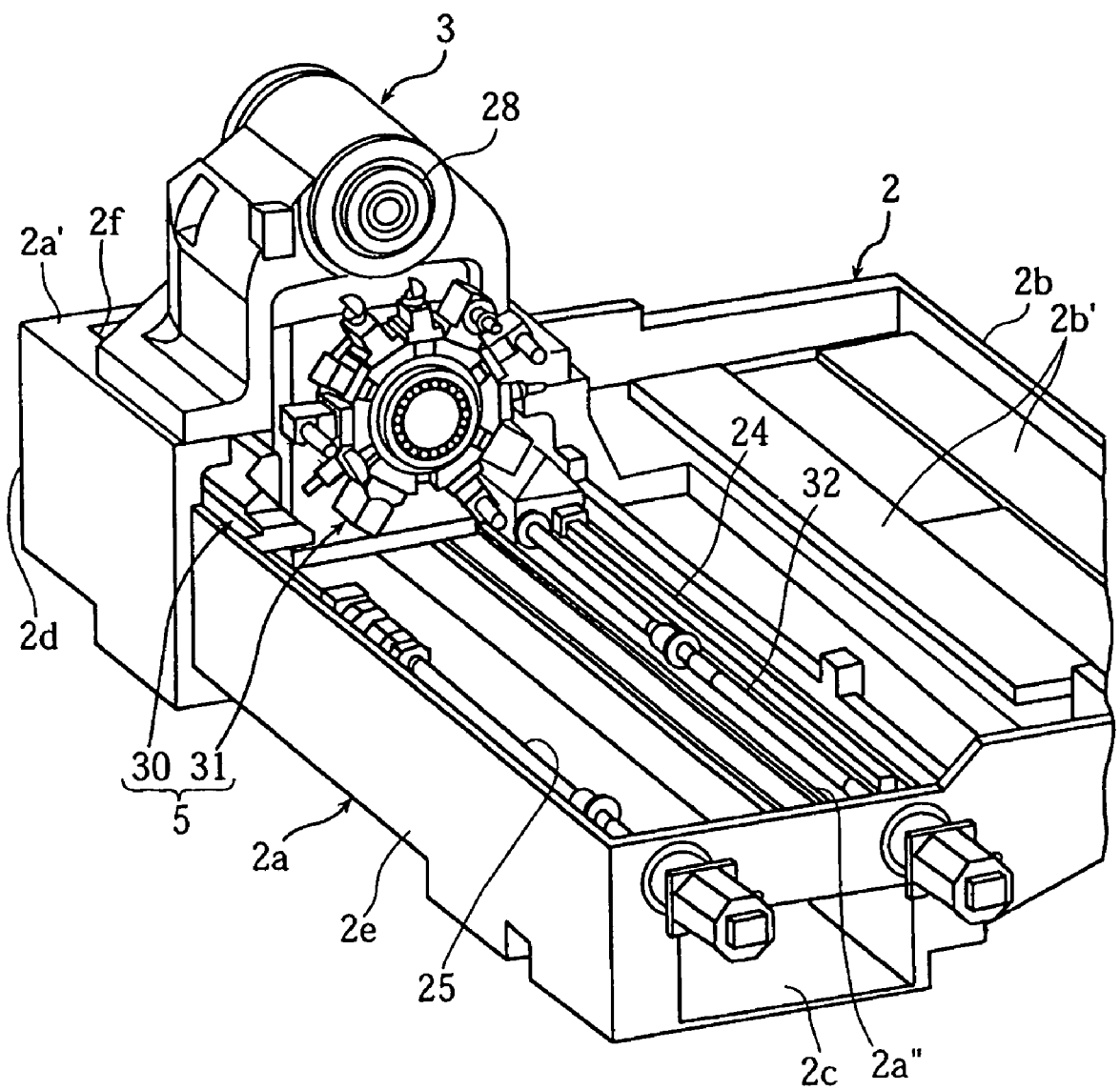
FIG. 4 is a perspective view of the bed.
Figure 5:
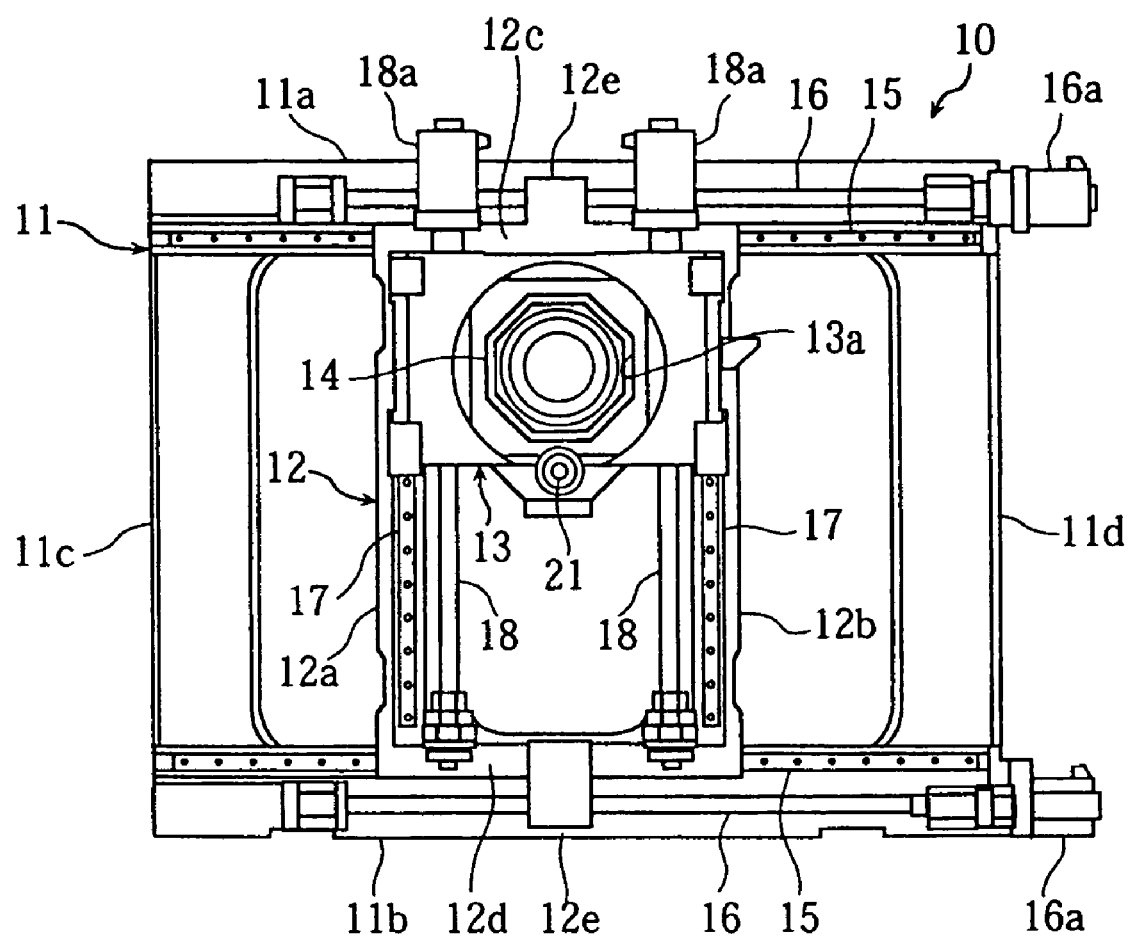
FIG. 5 is a front view of a supporting mechanism for a third spindle of the composite lathe.
Figure 6:
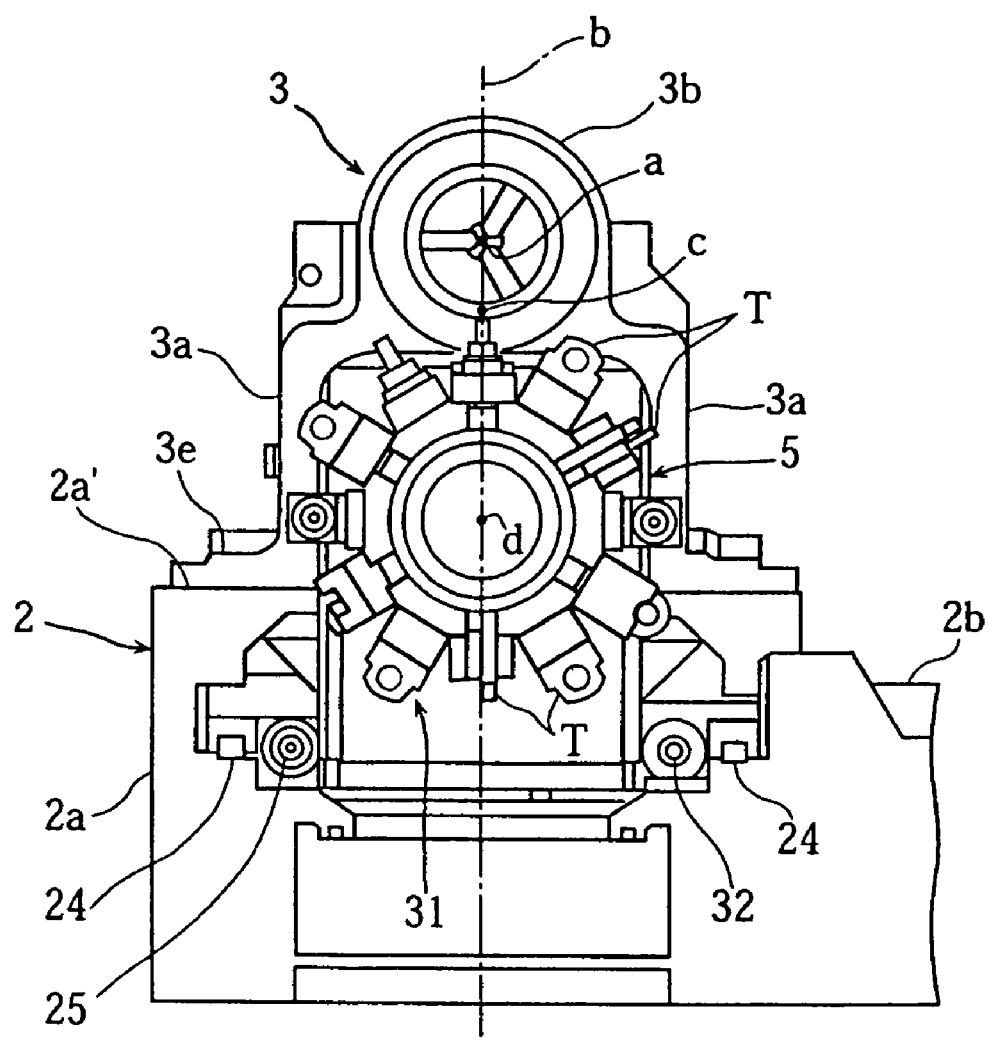
FIG. 6 is a side view of a first spindle headstock and a tool post disposed on the bed.
Figure 7A:
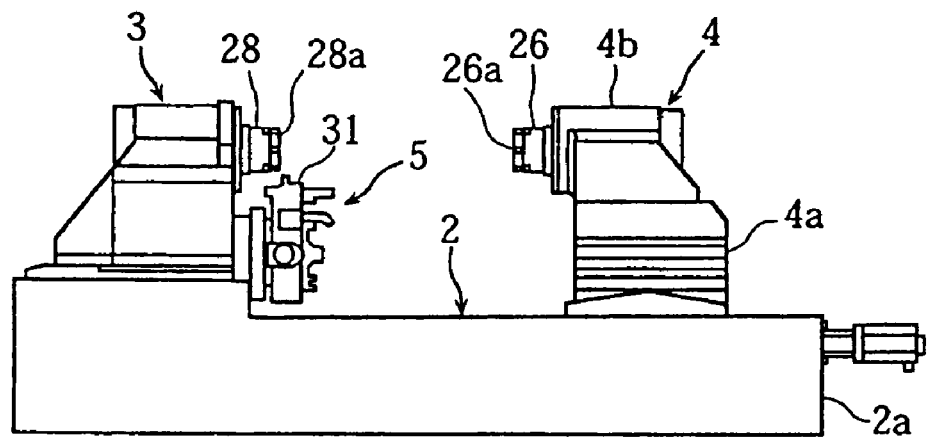
FIG. 7(*a*), FIG. 7(*b*), and FIG. 7(*c*) are views showing operations of the first spindle headstock, a second spindle headstock, and the tool post.
Figure 7B:
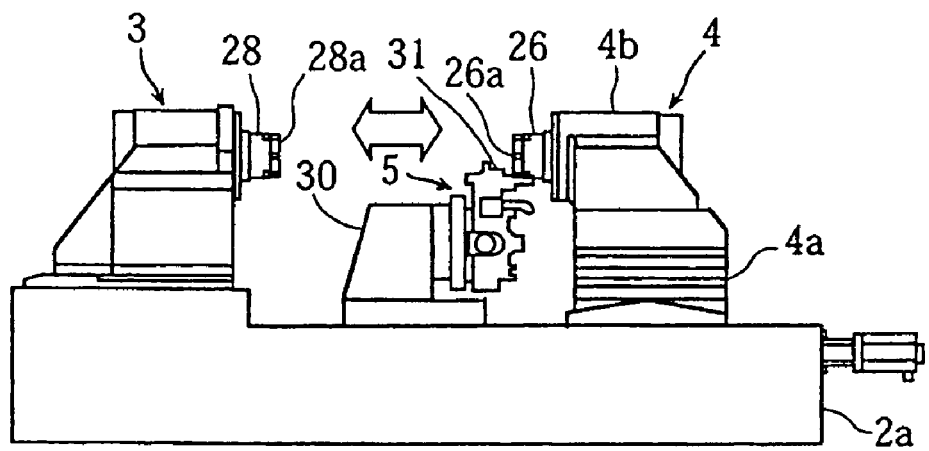
Figure 7C:
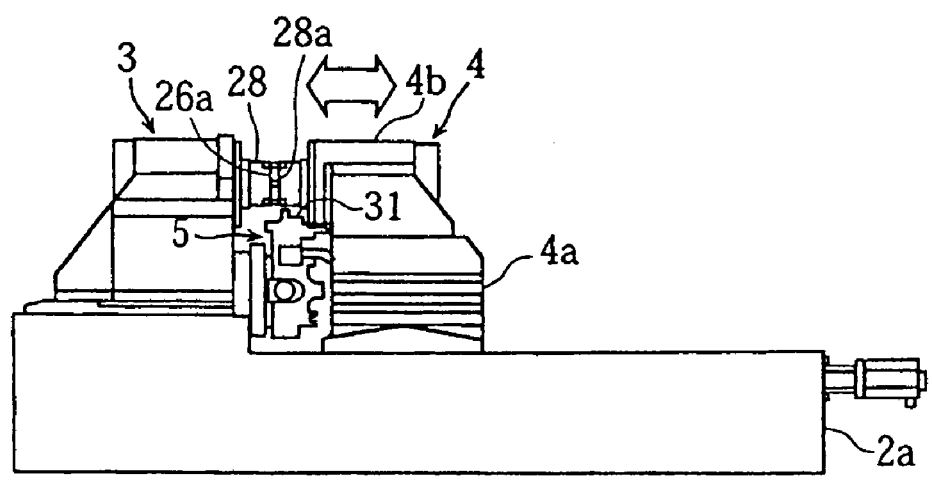
Figure 17:
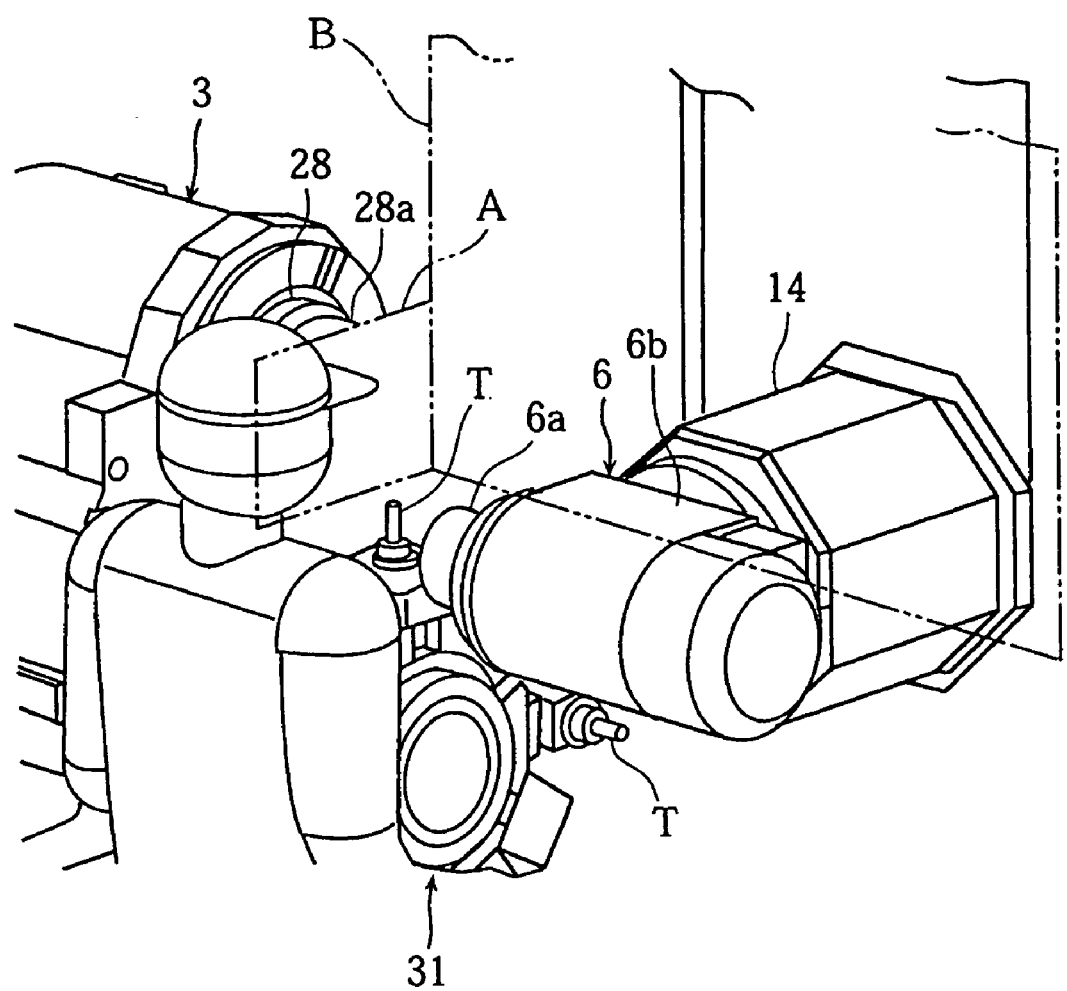
FIG. 17 is a perspective view showing an X-axis stroke of the third spindle.
Figure 18:
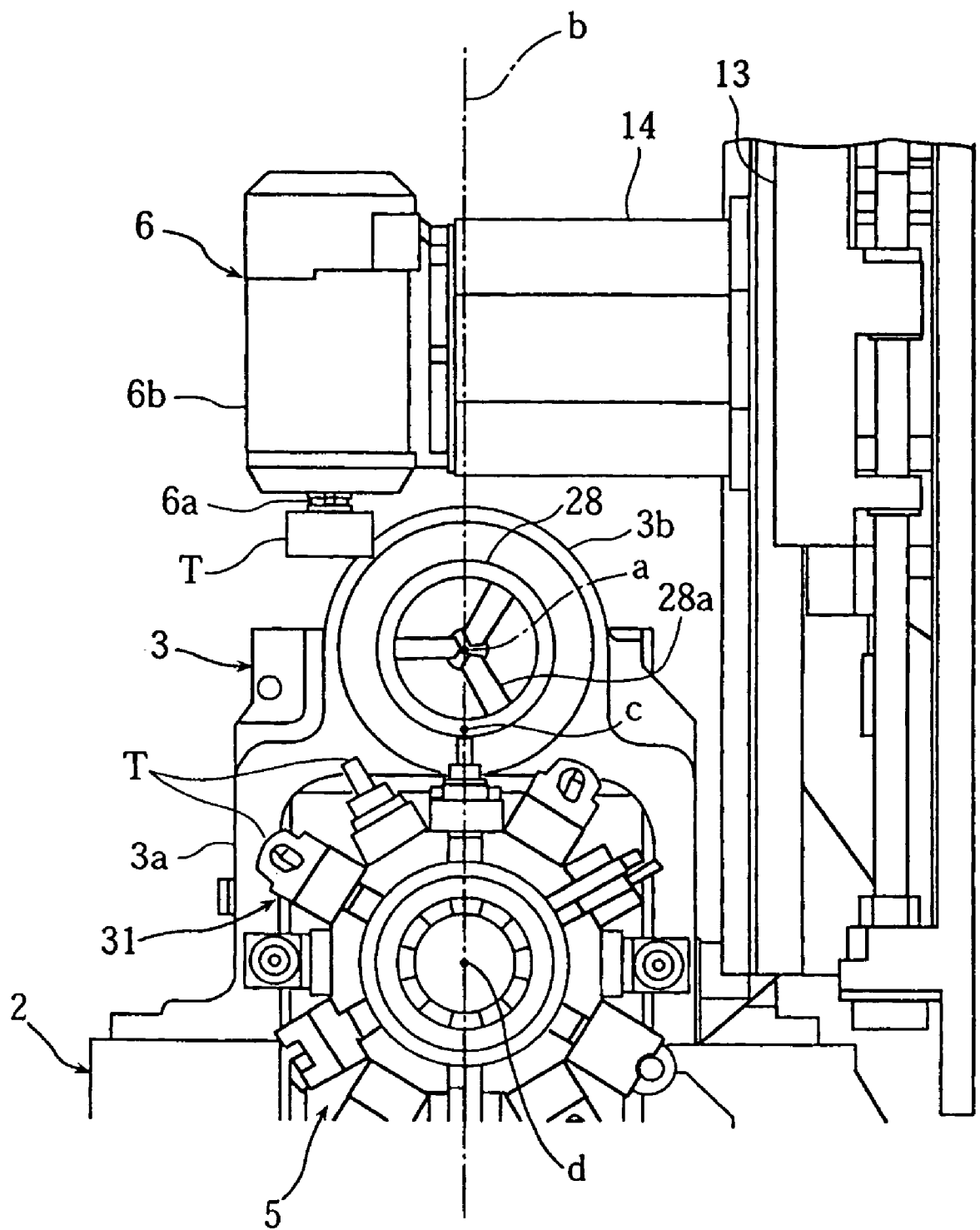
FIG. 18 is a side view showing a Y-axis stroke of the third spindle.

FIG. 1 to FIG. 18 are views to illustrate a composite lathe according to one embodiment of the present invention. FIG. 1 and FIG. 2 are a perspective view and a right side view of the composite lathe respectively, FIG. 3 and FIG. 4 are perspective views of a bed on which a first spindle headstock and a tool post are mounted, FIG. 5 is a front view of a supporting mechanism supporting a third spindle, FIG. 6 is a right side view of the first spindle headstock and the tool post, FIG. 7(a) to FIG. 7(c) are front views showing operations of the first spindle headstock, a second spindle headstock, and the tool post, FIG. 8 to FIGS. 11(a), (b) are views of the first spindle headstock, FIG. 12 is a perspective view of a cooling oil jacket of the first spindle headstock, FIG. 13 to FIG. 16 are views of the tool post, and FIG. 17 and FIG. 18 are views showing X-axis and Y-axis direction strokes of the third spindle. Note that front/back and left/right mentioned in this embodiment mean front/back and left/right when the machine is seen from a front side, unless otherwise noted.

In the drawings, 1 denotes the composite lathe. When seen from the front side of the machine shown in FIG. 1, the composite lathe 1 includes: a bed 2; a first spindle headstock 3 disposed on a left end portion on the bed 2; a second spindle headstock 4 disposed on the right side of the first spindle headstock 3 to be coaxial with the first spindle headstock 3 and to be movable in a Z-axis (left/right) direction; a tool post 5 disposed between the first and second spindle headstocks 3, 4 to be movable in an X-axis (up/down) direction and in the Z-axis direction; and a third spindle 6 disposed on the bed 2 to be movable in the X-axis direction, a Y-axis (front/back) direction, and the Z-axis direction. On a back left end portion on the bed 2, provided is a tool changer 7 automatically changing a preceding-process tool attached to the third spindle 6 to a subsequent-process tool.

As shown in FIG. 3, the bed 2 is constituted of a front bed part 2a and a back bed part 2b which are integrally molded. A first and a second mounting surface 2a', 2a" are formed on the front bed part 2a and third mounting surfaces 2b' are formed on the back bed part 2b, all these surfaces being horizontal along the Z-axis direction and the Y-axis direction.

Compared with the second mounting surface 2a" of the front bed part 2a, the first mounting surface 2a' is positioned higher than the second mounting surface 2a", and the third mounting surfaces 2b' of the back bed part 2b are positioned lower than the first mounting surface 2a' and higher than the second mounting surface 2a", so that they are formed in a stepped manner.

The first spindle headstock 3 is mounted on the first mounting surface 2a'. On the second mounting surface 2a", the second spindle headstock 4 and the tool post 5 are mounted to be movable in the Z-axis direction. Further, on the third mounting surfaces 2b', a supporting mechanism 10 movably supporting the third spindle 6 is mounted.

The supporting mechanism 10 includes: a column 11 in a rectangular frame shape which is fixed on the third mounting surfaces 2b' of the back bed part 2b to extend vertically upward; a saddle 12 in a rectangular frame shape which is supported on a front face of the column 11 to be movable in the Z-axis direction; a cross slide 13 supported on a front face of the saddle 12 to be movable in the X-axis direction; and a ram 14 supported by the cross slide 13 to be movable in the Y-axis direction and supporting the third spindle 6.

The column 11 is structured such that left and right support posts 11c, 11d and upper and lower beam parts 11a, 11b, which couple upper and lower ends of the left and right support posts 11c, 11d, are integrally molded. The column 11 is firmly fixed on the third mounting surfaces 2b' of the back bed part 2b.

Similarly to the column 11, the saddle 12 is structured such that left and right support posts 12a, 12b and upper and lower beam parts 12c, 12d, which couple upper and lower ends of the left and right support posts 12a, 12b, are integrally molded. The saddle 12 is supported to be movable in the Z-axis direction by a pair of upper and lower Z-axis guide rails 15, 15 which are disposed in parallel to the Z axis on front faces of the upper and lower beam parts 11a, 11b of the column 11. Z-axis ball screws 16, 16 are screwed to nut parts 12e, 12e formed in the upper and lower beam parts 12c, 12d of the saddle 12. The saddle 12 is driven to reciprocate in the Z-axis direction when the Z-axis ball screws 16, 16 are rotary driven by servo motors 16a, 16a. Note that the Z-axis ball screws 16, 16 are disposed in parallel to the Z-axis on the front faces of the upper and lower beam parts 11a, 11b of the column 11.

The cross slide 13 is formed in a rectangular thick plate shape and is supported to be movable in the X-axis direction by a pair of left and right X-axis guide rails 17, 17 which are disposed in parallel to the X axis on the front faces of the left and right support posts 12a, 12b of the saddle 12. X-axis ball screws 18, 18 are screwed to nut parts formed on left and right sides of the cross slide 13. The cross slide 13 is driven to reciprocate in the X-axis direction when the X-axis ball screws 18, 18 are rotary driven by servo motors 18a, 18a. Note that the X-axis ball screws 18, 18 are disposed in parallel to the X axis on the front faces of the left and right support posts 12a, 12a of the saddle 12.

The ram 14 is inserted in a ram guide hole 13a formed in the cross slide 13 and is supported to be movable in the Y-axis direction by guide plates (not shown) which are arranged on an inner circumferential surface of the ram guide hole 13a, being a predetermined angle apart from one another. One Y-axis ball screw 21 disposed in a lower portion of a widthwise center of the cross slide 13 is screwed to a nut part of the ram 14. The ram 14 is driven to reciprocate in the Y-axis direction when the Y-axis ball screw 21 is rotary driven by a servo motor.

The third spindle 6 is rotatably inserted in the ram 14. At a tip of the third spindle 6, a tool spindle 6a is disposed, with its axis directed perpendicularly to the Y axis. A tool is attached to a tip of the tool spindle 6a and the tool spindle 6a is rotary driven by a driving motor 6b. Further, the third spindle 6 can be rotary indexed around the Y axis (B axis) for positioning by a built-in rotary indexing mechanism (not shown).

The front bed part 2a includes: a first mounting part 2d having the first mounting surface 2a' formed on an upper surface thereof; and a second mounting part 2e having the second mounting surface 2a" which is formed so as to be positioned lower than the first mounting surface 2a'.

The first mounting part 2d has a recession 2f continuing from the second mounting surface 2a", and a bottom of the recession 2f is flush with the second mounting surface 2a". Therefore, the first mounting surface 2a' is in a U-shape when seen from above.

Further, a center trough 2c in a groove form whose upper side is open is formed in a front/back-direction center portion of the second mounting surface 2a" of the front bed part 2a. At a right wall of the front bed part 2a, the center trough 2c is open to the outside. In the center trough 2c, a chip conveyer (not shown) conveying chips to the outside through the opening is disposed.

On the second mounting surface 2a" of the front bed part 2a, a pair of front and back second spindle guide rails 24, 24, by which the second spindle headstock 4 is supported to be movable in the Z-axis direction, are disposed in parallel to the Z axis. The second spindle guide rails 24 both extend to the inside of the recession 2f of the first mounting part 2d. On an inner side of and adjacently to the front-side guide rail 24 out of the both second spindle guide rails 24, one second spindle ball screw 25 is disposed to drive the Z-axis direction reciprocal movement of the second spindle headstock 4. Further, on an inner side and adjacently to the opposite guide rail 24, one tool post ball screw 32 is disposed to drive the Z-axis direction reciprocal movement of the tool post 5.

The second spindle headstock 4 includes: a movable base 4a mounted on the second spindle guide rails 24, 24 to be slidable in the Z-axis direction; and a spindle headstock main body 4b fixed on the movable base 4a and having a cylindrical part. A second spindle 26 facing the first spindle headstock 3 is rotatably inserted in the spindle headstock main body 4b. The second spindle 26 includes a chuck 26a holding a workpiece and is rotary driven by a built-in driving motor.

When seen in the Z-axis direction, the first spindle headstock 3 includes: left and right leg parts 3a, 3a in a wide flat plate shape positioned on the left and right; a cylindrical spindle case part 3b coupling upper ends of the leg parts 3a; and a coupling part 3c coupling the spindle case part 3b and the left and right leg parts 3a, 3a on an opposite side of the second spindle headstock 4, and these components of the first spindle headstock 3 are integrally molded. Therefore, a tunnel part 3d surrounded by the leg parts 3a, the spindle case part 3b, and the coupling part 3c is formed in the first spindle headstock 3.

When seen from above, the coupling part 3c forms a V-shape continuing from the left and right leg parts 3a to extend to the opposite side of the second spindle headstock 4, and when seen from the side, it forms a triangular shape continuing from the spindle case part 3b to widen toward an obliquely downward direction. A flange part 3e protruding outward is integrally formed along the whole periphery of lower ends of the left and right leg parts 3a, 3a and the coupling part 3c. The flange part 3e is fixedly bolted to the first mounting surface 2a'.

The first spindle headstock 3 is formed to be thermally symmetrical. Here, "thermally symmetrical" means a state in which a left portion and a right portion across a plane of symmetry are substantially equal in thermal expansion amount and the whole structure expands along this plane of symmetry. Concretely, when a cross section taken along a plane including the X axis and the Y axis is seen in the Z-axis direction (see FIG. 11(a)), a plane including a vertical line "b" going through an axis "a" of the spindle case part 3b is a plane of symmetry, and the left and right leg parts 3a, 3a, the coupling part 3c, and the spindle case part 3b are formed to be almost laterally symmetrical with respect to the plane of symmetry. With this structure, the first spindle headstock 3 thermally expands only in the direction of the vertical line "b".

Figure 11A:
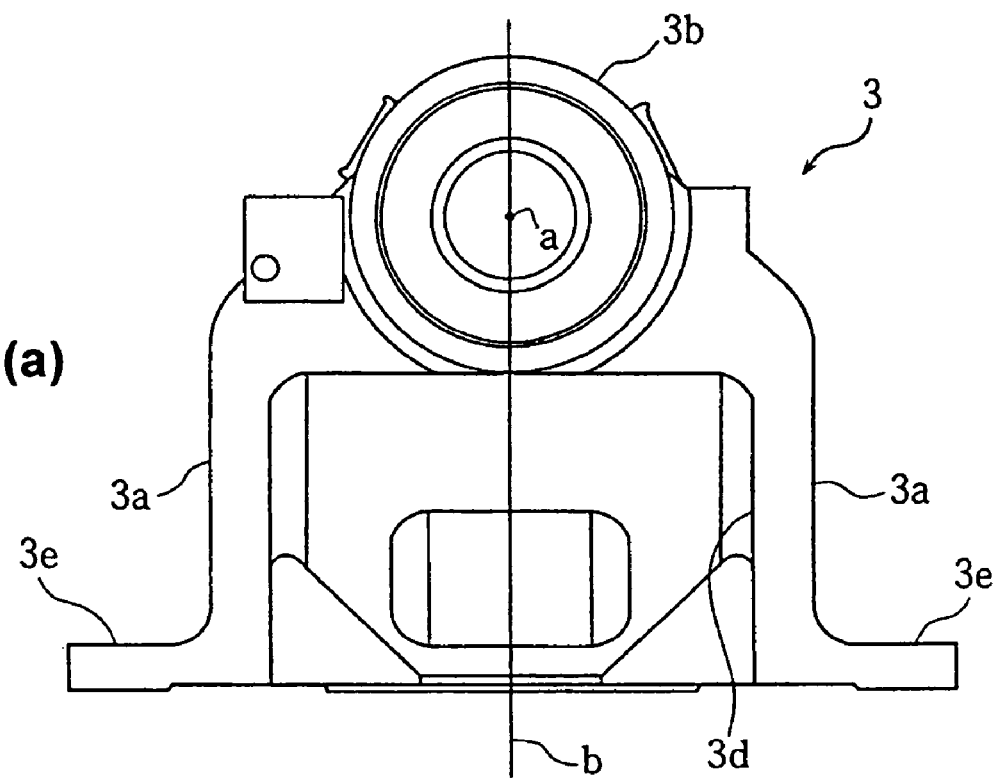
FIG. 11(a) and FIG. 11(b) are views of the first spindle headstock.
Figure 11B:
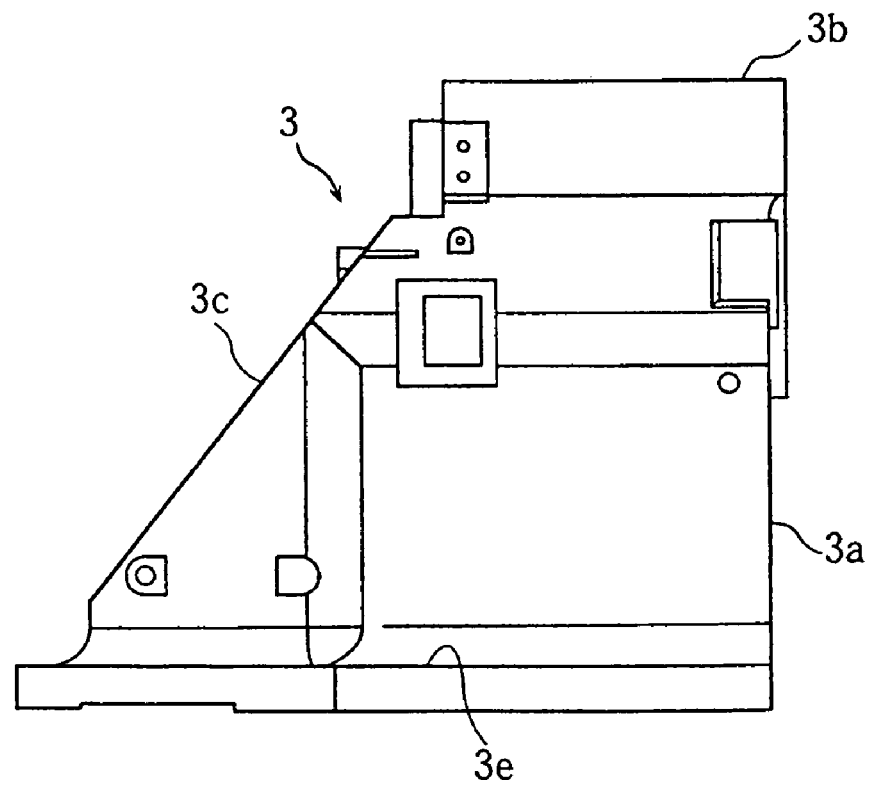
Figure 12:
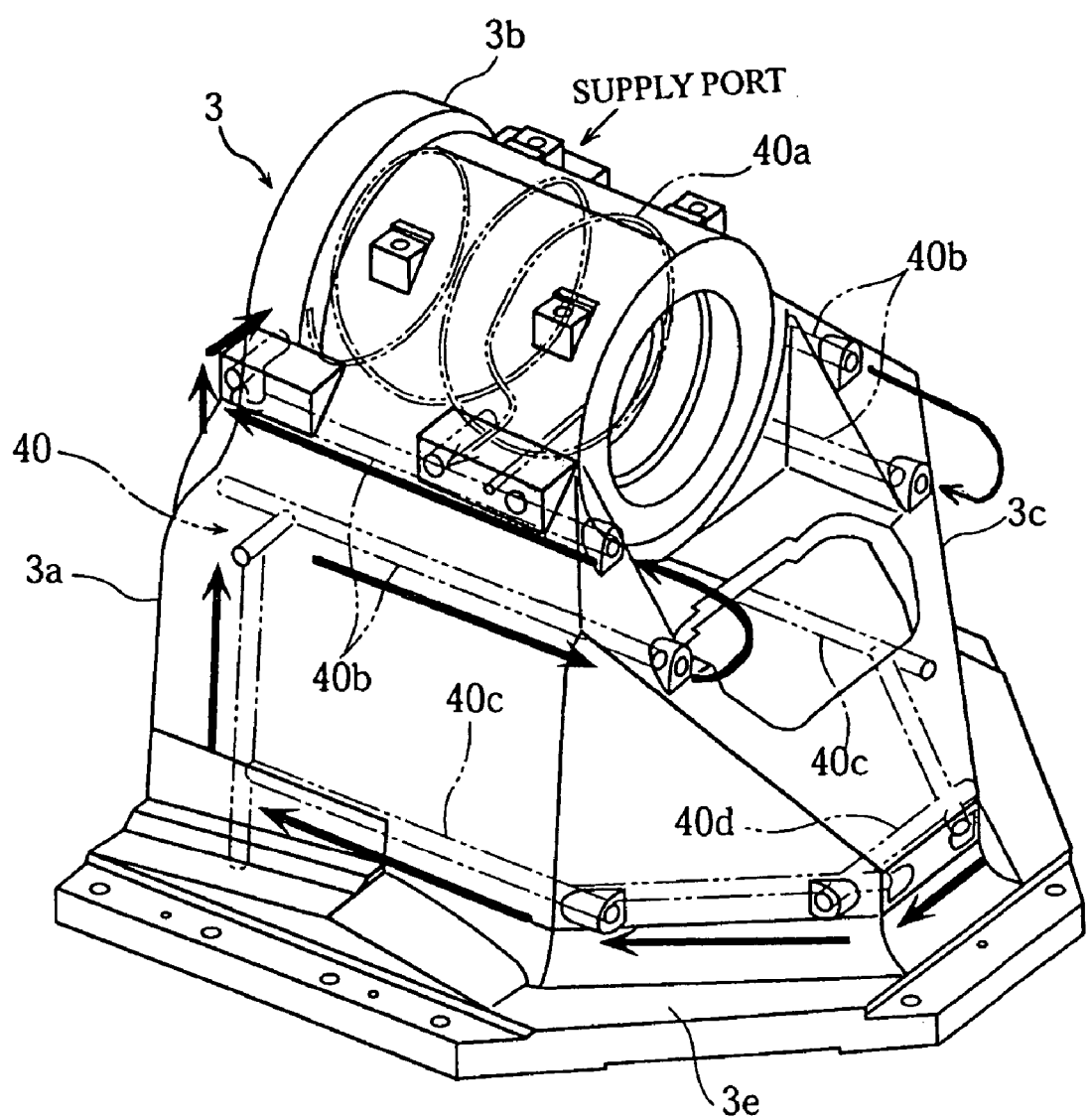
FIG. 12 is a perspective view of a cooling oil jacket of the first spindle headstock.
Figure 13:
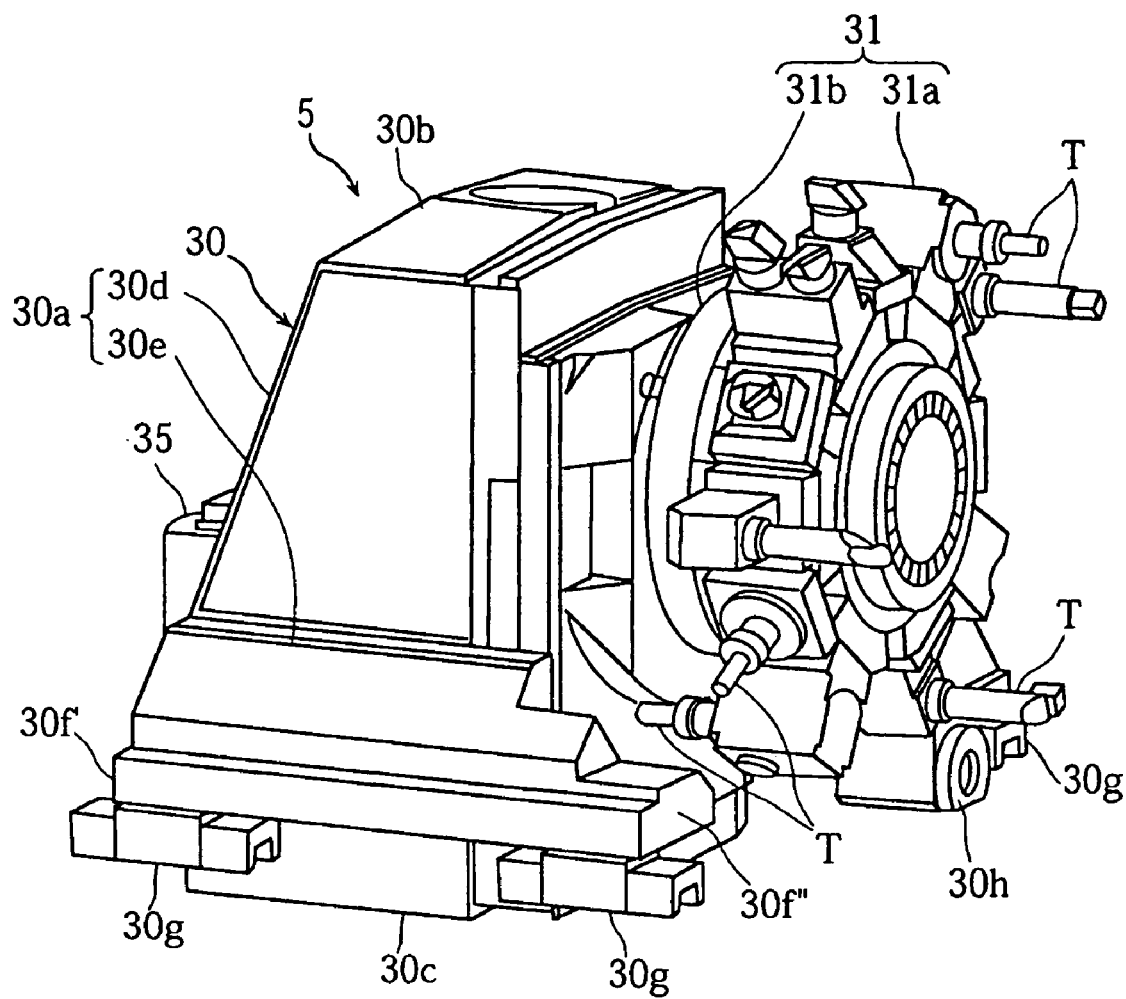
FIG. 13 is a perspective view of the tool post.
Figure 14:
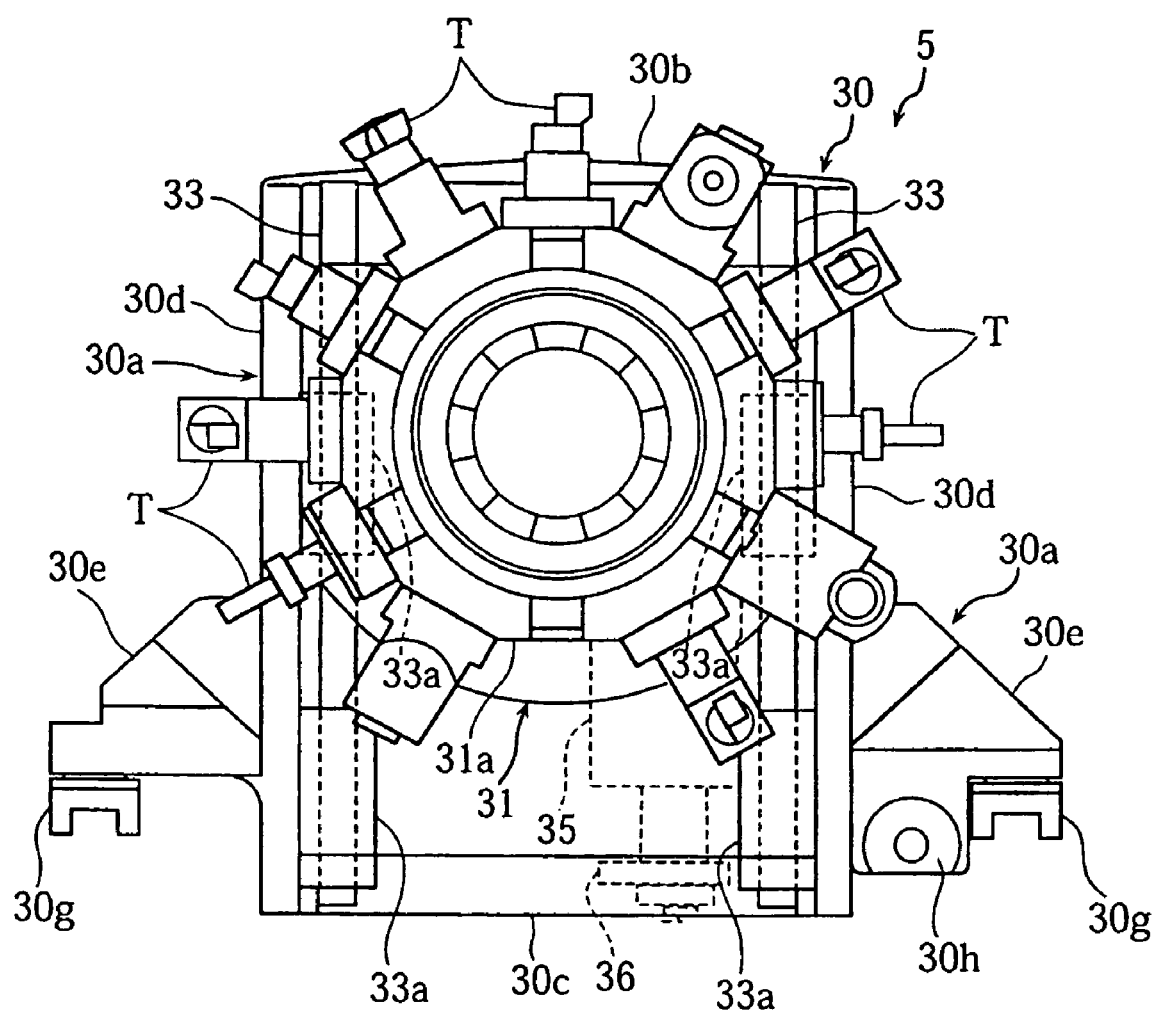
FIG. 14 is a side view of the tool post.

On the other hand, when a cross section of the first spindle headstock 3 taken along a plane including the X axis and the Z axis is seen in the Y-axis direction, the cross section is not symmetrical (see FIG. 11(b)) in this embodiment. Therefore, strictly speaking, the aforesaid thermal symmetry is difficult to realize. Therefore, this embodiment adopts a structure such that a cooling oil jacket 40 is formed in the first spindle headstock 3 as shown in FIG. 12 to more surely realize the aforesaid thermal symmetry by cooling by the cooling oil jacket 40.

Specifically, in the cooling structure of this embodiment, the leg parts 3a, 3a and the coupling part 3c are more surely cooled by a large amount of cooling oil than the spindle case part 3b so that the aforesaid axis "a" moves only upward along the vertical line "b" due to thermal expansion. Concretely, the cooling oil jacket 40 has: a spindle cooling oil passage 40a in a coiled shape formed on an outer circumferential portion of the spindle case part 3b; a pair of upper and lower upper leg cooling oil passages 40b, 40b formed along an upper portion of each of the left and right leg parts 3a, 3a; lower leg cooling oil passages 40c, 40c formed along lower portions of the left and right leg parts 3a, 3a; and a coupling part cooling oil passage 40d formed along a lower portion of the coupling part 3c. Compared with the spindle cooling oil passage 40a, the other cooling oil passages 40b to 40d are larger in diameter. This structure makes it possible to more surely cool the leg parts 3a, 3a which may possibly hinder the realization of the aforesaid thermal symmetry, so that as a whole, the first spindle headstock 3 can expand only in the upward direction along the vertical line "b".

The cooling oil is supplied from a supply port provided in the middle of the upper cooling oil passage 40b disposed on a back side in FIG. 12. The cooling oil moves in the right direction in the drawing in the upper cooling oil passage 40b, moves in the left direction in the drawing in the cooling oil passage 40b immediately under via an external pipe, goes down, moves in 40c on the back side in the drawing and 40d, moves in 40c on the front side in the drawing, goes up, moves in the right direction in the lower-side 40b disposed on the front side in the drawing, moves in the left direction in 40b immediately above via an external pipe, moves spirally in 40a, and is discharged from an outlet formed in 40a.

A first spindle 28 is rotatably inserted in the spindle case part 3b to be coaxial with the second spindle 26. The first spindle 28 includes a chuck 28a holding a workpiece and is rotary driven by a built-in driving motor.

Figure 8:
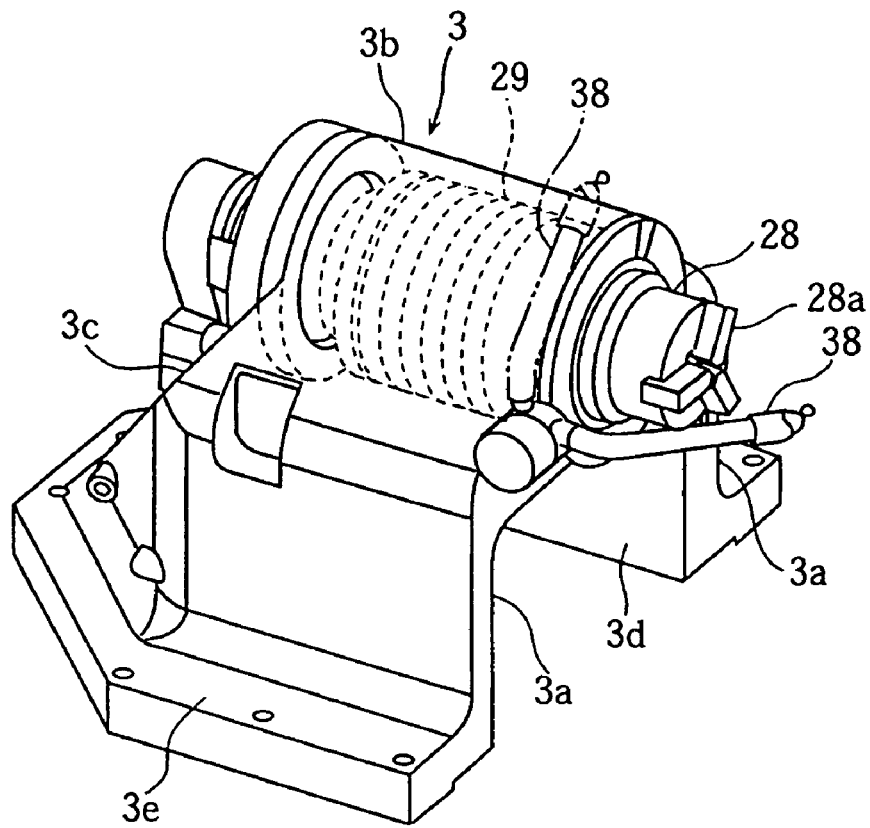
FIG. 8 is a perspective view of the first spindle headstock.
Figure 9:
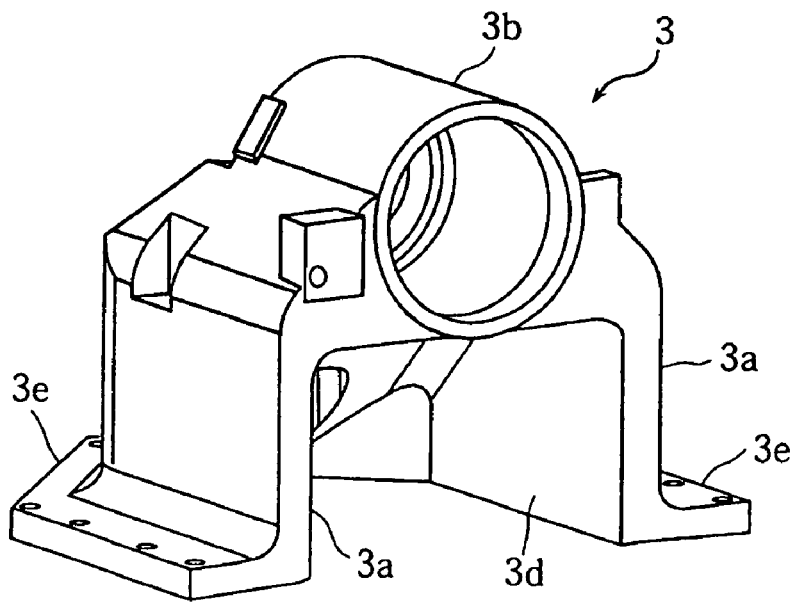
FIG. 9 is a perspective view of the first spindle headstock.
Figure 10:
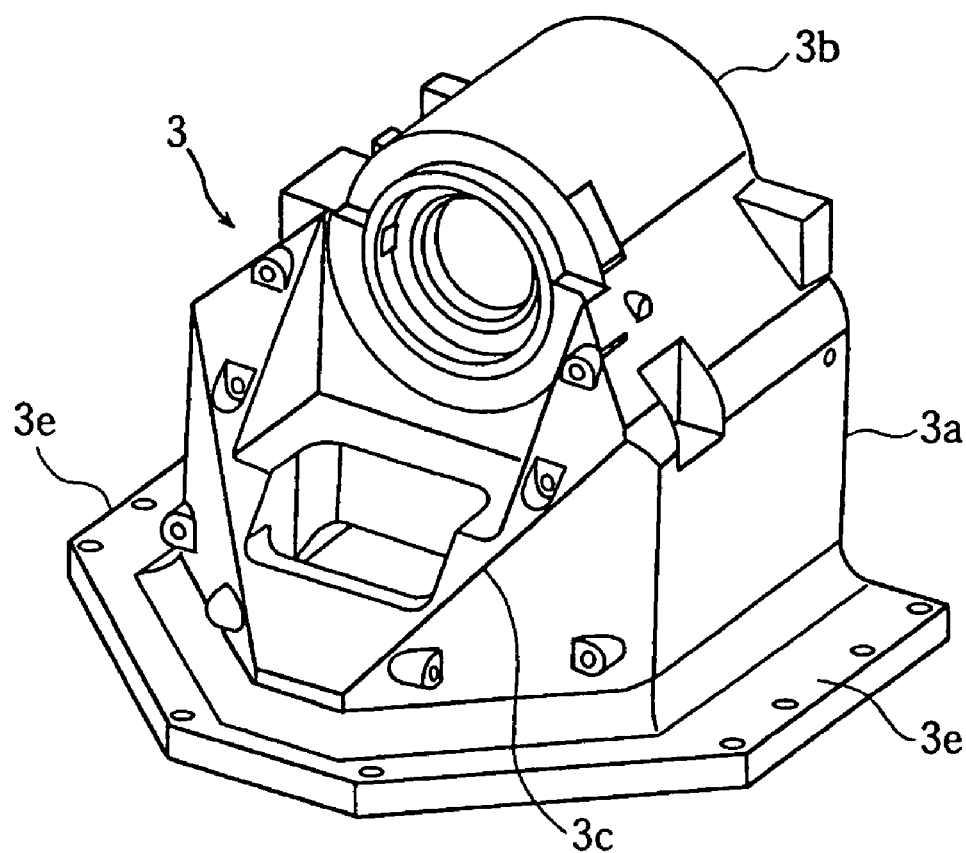
FIG. 10 is a perspective view of the first spindle headstock.

A presetter 38 is further attached to the first spindle headstock 3, as shown in FIG. 8 The presetter 38 is intended for measuring a blade edge position of a tool before machining and it performs the measurement both for a tool of a turret 31 and for a tool of the third spindle 6, as will be described later.

The tool post 5 has the turret 31 and a supporting member 30 by which the turret 31 is supported to be movable in the X-axis direction. The turret 31 includes: a turret head 31a to whose outer circumferential portion a large number of tools T are attached, being a predetermined angle apart from one another; and a rotary indexing mechanism 31b supporting the turret head 31a rotary indexably. The rotary indexing mechanism 31b rotary-indexes a desired tool T at a predetermined machining position to clamp it at the machining position. An indexing motor 31c of the rotary indexing mechanism 31b is disposed on a back face of the turret 31 when seen from the right side in the Z-axis direction.

The supporting member 30 is a molded product in a rectangular frame shape and has: left and right leg parts 30a, 30a positioned on the left and right when seen in the Z-axis direction; an upper beam part 30b integrally coupling upper ends of the both leg parts 30a, 30a; and a lower beam part 30c integrally coupling lower ends thereof. Therefore, a portion inside the frame of the supporting member 30 is a rectangular space.

The respective leg parts 30a have: vertical wall parts 30d, 30d in a wide flat plate shape; and supporting parts 30e, 30e formed in lower portions of outer walls of the respective vertical wall parts 30d and extending in the Z-axis direction. When seen in the Y-axis direction, left ends 30f' of the respective supporting parts 30e are in line with left end faces of the vertical wall parts 30d, while right ends 30f" thereof extend up to the vicinity of a center portion of the turret head 31a across right end faces of the vertical wall parts 30d.

In the supporting member 30, linear guides 30g disposed on bottom faces of longitudinal both ends of the respective supporting parts 30e, 30e are supported by the aforesaid front and back second spindle guide rails 24, 24, so that the supporting member 30 is movable in the Z-axis direction. Further, a nut member 30h is disposed in a lower portion of the right supporting part 30e, and the tool post ball screw 32 provided on the inner side of the back-side second spindle guide rail 24 is screwed to the nut member 30h. The supporting member 30 reciprocates in the Z-axis direction when the tool post ball screw 32 is rotated by a servo motor 32a.

When seen from a right side in the Z-axis direction, on front faces (faces on the front side) of the left and right leg parts 30a, 30a of the supporting member 30, provided are turret guide rails 33, 33 extending in the X-axis direction. Linear guides 33a, 33a are supported by the turret guide rails 33, 33 to be slidable in the X-axis direction, and the linear guides 33a are fixed on the back face of the turret 31. With this structure, the turret 31 is supported by the supporting member 30 to be movable in the X-axis direction.

Further, one turret ball screw 34 is disposed in parallel to the X axis in the supporting member 30 so as to extend between the upper and lower beam parts 30b, 30c. A nut member 34a is screwed to the turret ball screw 34, and the nut member 34a is integrally provided on the back face of the turret 31.

Further, in the supporting member 30, an extension part 30f is formed in the lower beam part 30c to extend in a backward direction from the leg part 30a, and a servo motor 35 is disposed on the extension part 30f. The servo motor 35 is coupled to the turret ball screw 34 via a timing belt 36. The turret 31 reciprocates in the X-axis direction when the ball screw 34 is rotary driven by the servo motor 35.

Figure 16:
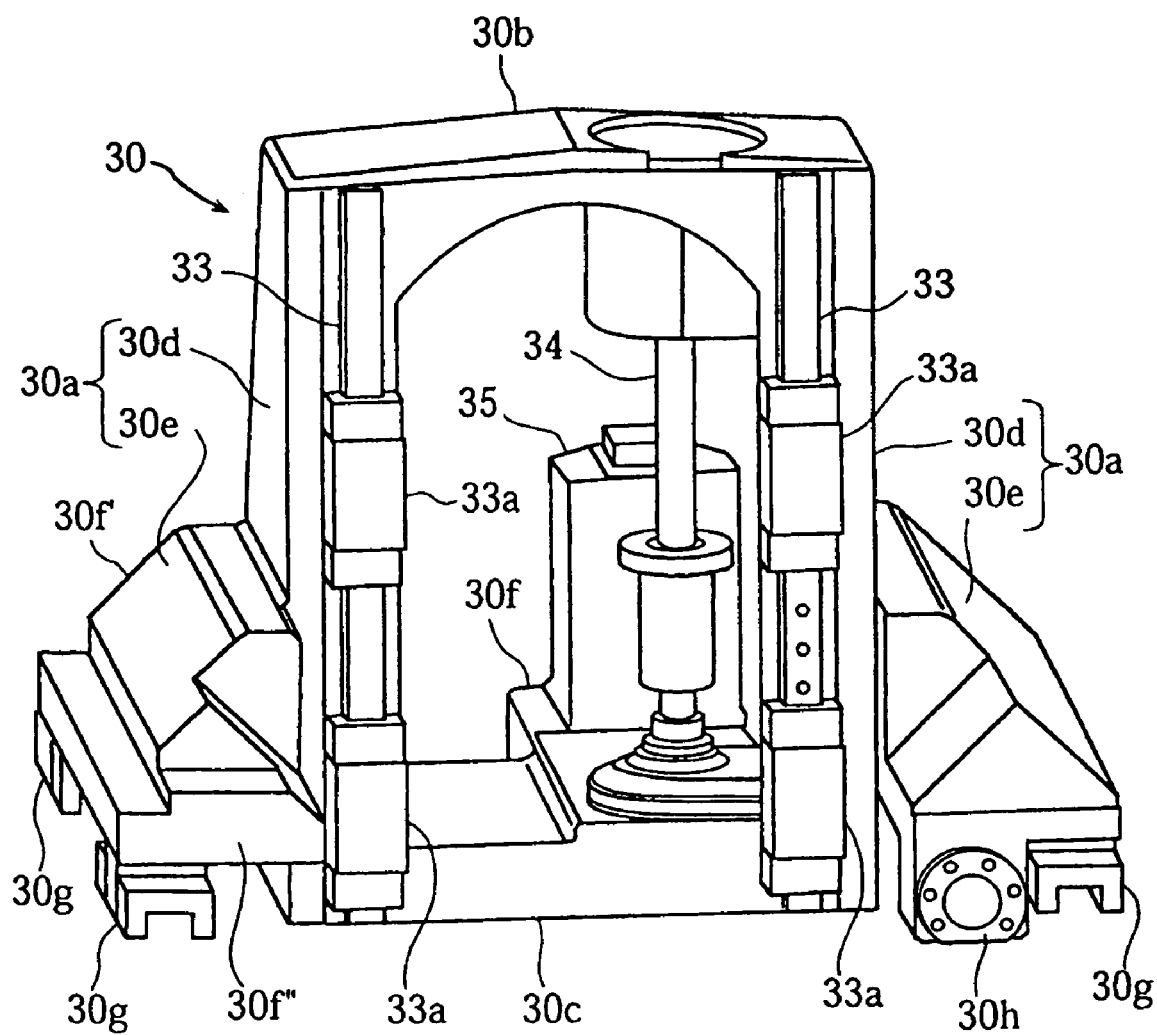
FIG. 16 is a perspective view of a supporting member of the tool post.

Here, when seen in the Z-axis direction, as shown in FIG. 16, the turret ball screw 34 and the servo motor 35 are disposed to be deviated toward the right side from the center line of the supporting member 30. Therefore, a left portion of the rectangular space of the supporting member 30 is a space where pipes, wiring, and so on can be arranged. Note that the indexing motor (not shown) of the rotary indexing mechanism 31b is positioned in a substantially center portion in the rectangular space of the supporting member 30 and moves in accordance with the X-axis direction movement of the turret 31.

The shape and dimension of the supporting member 30 are set so that it can move into/out of the tunnel part 3d of the first spindle headstock 3. In a state in which the supporting member 30 is housed in the tunnel part 3d, the turret 31 is positioned right under the first spindle 28. To be in more detail, a cutting point by a tool positioned at the machining position out of the tools T attached to the turret 31 is constantly positioned on the vertical line "b" going through the aforesaid axis "a".

The second spindle headstock 4 is movable to a delivery position where it can directly receive a workpiece attached to the first spindle 28 of the first spindle headstock 3. Concretely, the second spindle headstock 4 is movable in the Z-axis direction up to a position so that front faces of the chucks of the first and second spindles 28, 26 abuttingly face each other (see FIG. 7(c)).

When the first and second spindles 28, 26 abut on each other, the tool post 5 can be positioned right under the first spindle headstock 3 so that the cutting point "c" is positioned vertically under the axis "a" of the first and second spindle headstocks 3, 4. Therefore, a workpiece cutting direction of the tool of the turret 31 is in line with the vertical line "b". Concretely, when seen from the right side in the Z-axis direction, as shown in FIG. 6, the cutting point "c" and a rotation center "d" of the turret 31 are collinear on the vertical line "b" going through the axis "a" of the first and second spindle headstocks 3, 4. Further, the vertical line "b" goes through the center of an interval between the second spindle guide rails 24, 24.

Further, a tool gripper of the third spindle 6 is constantly positioned within an area surrounded by the aforesaid pair of upper and lower Z-axis guide rails 15, 15 and pair of left and right X-axis guide rails 17, 17. A movement area of a cutting point of the third spindle 6 overlaps a movement area of the cutting point "c" of the tool post 5 and further includes an area under the cutting point "c" when seen in the Z-axis direction.

Here, when seen from above, an XY supporting plane A (see FIG. 15) parallel to the X axis and the Y axis by which the turret 31 of the tool post 5 is supported to be movable in the X-axis direction is orthogonal to an XZ supporting plane B (see FIG. 2) parallel to the X axis and the Z axis by which the third spindle 6 is supported to be movable in the X-axis direction. To be in more detail, the XY supporting plane A means a plane including both sliding surfaces of the left and right turret guide rails 33, 33 of the supporting member 30. Further, the XZ supporting plane B means a plane including both sliding surfaces of the left and right X-axis guide rails 17, 17 of the saddle 12.

Figure 15:
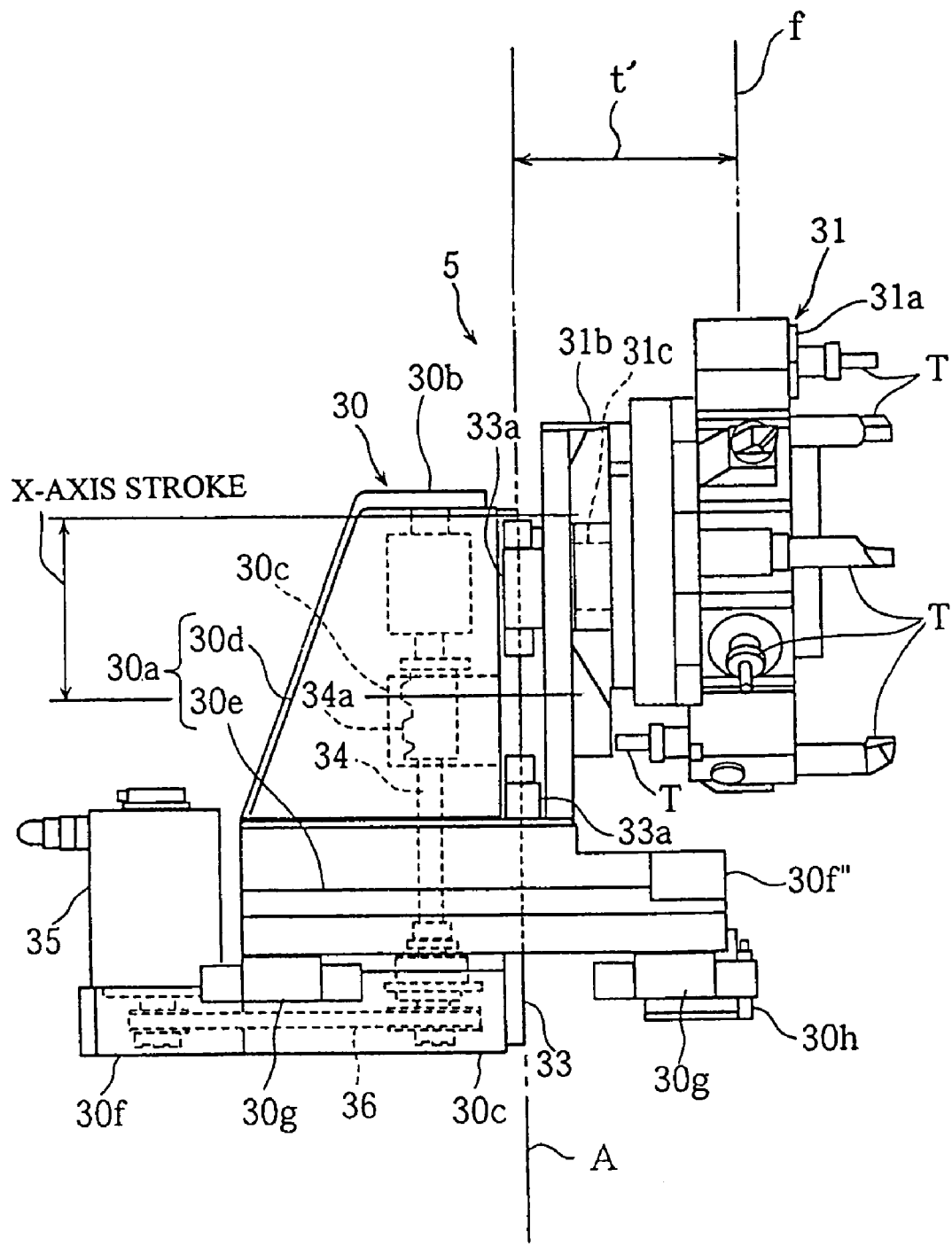
FIG. 15 is a front view of the tool post.

Further, as shown in FIG. 2, an X-axis direction movement line (the aforesaid vertical line "b") of the turret 31 in the tool post 5 is arranged a predetermined distance "t" apart in the Y-axis direction from the XZ supporting plane B of the third spindle 6. Further, as shown in FIG. 15, in a state where the third spindle 6 is machining the shortest workpiece held on the first spindle headstock 3, an X-axis direction movement line "f" of the third spindle 6 is arranged a predetermined distance t' apart from the XY supporting plane A of the turret 31.

In the composite lathe of this embodiment, while the workpiece is rotated by the first spindle headstock 3 or the second spindle headstock 4, the tool post 5 cuts in the workpiece to perform cutting work and the third spindle 6 performs machining such as grinding and boring.

According to this embodiment, the XY supporting plane A by which the turret 31 of the tool post 5 is supported to be movable in the X-axis direction is orthogonal to the XZ supporting plane B by which the third spindle 6 is supported to be movable in the X-axis direction, and the X-axis movement lines of the turret post 5 and the third spindle 6 are set apart from the XY supporting plane A and the XZ supporting plane B, which allows the movement area of the cutting point "c" of the tool post 5 to overlap the movement area of the cutting point of the third spindle 6, realizing enhanced machinability. Further, the supporting planes A, B do not interfere with each other, neither the tool post 5 nor the third spindle 6 need not overhang, and therefore, supporting stiffness of the tool post 5 and the third spindle 6 is not lowered.

In this embodiment, the cutting point "c" of the tool post 5 is positioned vertically under the straight line connecting the axes "a" of the first and second spindle headstock, and the tool post 5 is disposed under the axes "a" of the first and second spindle headstocks 3, 4. Therefore, it is possible to reduce the front/back direction dimension of the machine main body compared with the structure where the tool post is disposed on the front side when seen from the front side of the machine, which realizes downsizing.

Further, since the movement area of the third spindle 6 is extended to the position under the cutting point "c" of the tool post 5, a tool blade edge position of the tool post 5 and a tool blade edge position of the third spindle 6 can be measured by the single presetter 38. As a result, it is possible to measure the tool positions in order to set the tools at a predetermined position, with a simple structure and at low cost.

In this embodiment, the tool spindle 6a of the third spindle 6 is supported to be rotary indexable around the Y axis, which allows complicate machining by so-called B-axis driving.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A composite lathe comprising:
   a bed;
   a first and a second spindle headstock disposed on said bed to face each other and to be coaxial with each other;
   a tool post disposed between said first spindle headstock and said second headstock to be movable in an X-axis (up/down) direction; and
   a third spindle disposed on said bed to be movable in the X-axis direction, a Y-axis (front/back) direction, and a Z-axis (left/right) direction,
   wherein an XY supporting plane which is parallel to the X-axis and Y axis and by which said tool post is supported to be movable in the X-axis direction and an XZ supporting plane which is parallel to the X axis and Z axis and by which said third spindle is supported to be movable in the X-axis direction are orthogonal to each other,
   wherein an axis of the movement in the X-axis direction of said tool post is set apart inthe Y-axis direction from the XZ supporting plane, and an axis of the movement in the X-axis direction of said third spindle is set apart in the Z-axis direction from the XY supporting plane, and
   wherein the XY supporting plane, which is parallel to the X axis and the Y axis, and the XZ supporting plane, which is parallel to the X axis and the Z axis, are orthogonal to each other.

2. The composite lathe according to claim 1,
   wherein a cutting point of said tool post is positioned vertically under a straight line connecting axes of said first spindle headstock and said second spindle headstock, and a movement area of a cutting point of said third spindle extends up to an area lower than the cutting point of said tool post positioned at a rising end in the X-axis direction.

3. The composite lathe according to claim 1,
   wherein said third spindle includes a tool spindle, and the tool spindle is rotary indexable around the Y axis.

* * * * *